(12) United States Patent
Pellini et al.

(10) Patent No.: US 11,098,710 B2
(45) Date of Patent: Aug. 24, 2021

(54) INLET CONTROL VALVE FOR HIGH PRESSURE FUEL PUMP

(71) Applicant: Stanadyne LLC, Windsor, CT (US)

(72) Inventors: Richard P Pellini, South Windsor, CT (US); Kenneth R Morel, Bloomfield, CT (US); David G Palermo, West Springfield, MA (US); Dominic M Myren, Chicopee, MA (US); Yevgeniy Norkin, Longmeadow, MA (US); Michael Wegrzyniak, East Granby, CT (US)

(73) Assignee: Stanadyne LLC, Windsor, CT (US)

( * ) Notice: Subject to any disclaimer, the term of this patent is extended or adjusted under 35 U.S.C. 154(b) by 86 days.

(21) Appl. No.: 16/390,117

(22) Filed: Apr. 22, 2019

(65) Prior Publication Data

US 2020/0182238 A1    Jun. 11, 2020

Related U.S. Application Data

(60) Provisional application No. 62/776,670, filed on Dec. 7, 2018.

(51) Int. Cl.
*F04B 49/22* (2006.01)
*F04B 53/10* (2006.01)
(Continued)

(52) U.S. Cl.
CPC ........... *F04B 49/22* (2013.01); *F02M 47/027* (2013.01); *F02M 59/368* (2013.01);
(Continued)

(58) Field of Classification Search
CPC ........... F02M 63/0017; F02M 63/0022; F02M 59/368; F02M 47/027; F04B 49/22;
(Continued)

(56) References Cited

U.S. PATENT DOCUMENTS 8,132,558 B2   3/2012   Lucas et al.
9,556,836 B2   1/2017   Morel et al.
(Continued)

FOREIGN PATENT DOCUMENTS

EP   2187038 A1   5/2010
EP   2236809 A2   10/2010
(Continued)

OTHER PUBLICATIONS

PCT International Search Report and Written Opinion dated Jul. 26, 2019 (PCT Appl. PCT/US2019/028472).

*Primary Examiner* — Kenneth J Hansen
(74) *Attorney, Agent, or Firm* — Alix, Yale & Ristas, LLP (57) ABSTRACT

The disclosed inlet check valve is used in a high pressure fuel pump and is comprised of a valve member integrally connected to a valve stem which is coupled to an inlet valve armature. The valve member has a stroke along an axis between an open position and a closed position. An inlet valve solenoid generates a magnetic field in an inlet valve pole to attract the inlet valve armature and move the valve member from the open position to the closed position. In the open position, the valve member contacts an inlet valve stop and a gap greater than the stroke of the valve member is defined along the axis between the inlet valve armature and the inlet valve pole. In the closed position, an inlet valve seat mates with the valve member and an armature gap remains between the inlet valve armature and the inlet valve pole.

13 Claims, 12 Drawing Sheets

(51) Int. Cl.
  *F02M 59/36* (2006.01)
  *F02M 47/02* (2006.01)
  *F02M 63/00* (2006.01)
  *F16K 17/04* (2006.01)
  *F16K 27/04* (2006.01)
(52) U.S. Cl.
  CPC ....... *F02M 63/0022* (2013.01); *F04B 53/103* (2013.01); *F04B 53/1087* (2013.01); *F16K 17/048* (2013.01); *F16K 27/048* (2013.01)
(58) Field of Classification Search
  CPC .. F04B 7/0076; F04B 53/103; F04B 53/1087; F16K 17/048; F16K 27/048
  See application file for complete search history.

(56) References Cited

U.S. PATENT DOCUMENTS

| | | | |
|---|---|---|---|
| 2012/0093670 A1* | 4/2012 | Usui | F02M 59/367 417/505 |
| 2015/0285166 A1 | 10/2015 | Surnilla et al. | |
| 2017/0254306 A1 | 9/2017 | Lucas | |
| 2017/0284389 A1* | 10/2017 | Fukuda | F04B 53/14 |
| 2018/0217619 A1 | 8/2018 | Duffy | |

FOREIGN PATENT DOCUMENTS

| | | |
|---|---|---|
| WO | 2013018129 A1 | 2/2013 |
| WO | 2015164256 A1 | 10/2015 |

\* cited by examiner

INLET CONTROL VALVE FOR HIGH PRESSURE FUEL PUMP

BACKGROUND

The present invention relates to high pressure fuel supply pumps for gasoline common rail injection systems. More particularly, the present disclosure relates an inlet control valve for use in a high pressure fuel supply pump.

Gasoline Direct Injection (GDI) fuel systems must regulate the fuel volume delivered to the common rail as part of an overall pressure management strategy. Two strategies are currently employed for controlling the quantity of fuel delivered to the pumping chamber and thus the degree to which the common rail is pressurized. One strategy uses a digital on/off solenoid such as disclosed in U.S. Pat. No. 7,707,996 and another uses a proportional valve such as disclosed in U.S. Pat. No. 6,792,916. The solenoid valves used for inlet metering are required to open and close very fast, so the valve actuation is coordinated with the pumping cycles of the high pressure pump. Fast acting solenoid driven valves are known to generate noise from contact between parts such as a valve member and a valve seat, or between a valve member and a valve stop. It is common for inlet metering valves to be arranged at or near the low pressure inlet of a high pressure pump (near the outside of the pump), where the noise generated by valve parts is easily transmitted. It is desirable to reduce the noise associated with inlet metering valves.

Single piston, cam driven high pressure fuel pumps have become a common solution for generating high pressure fuel in common rail direct injection gasoline (GDI) engines. It is known in the industry that the pump must incorporate an outlet check valve to prevent pressure bleed back from the rail while the pump is in the intake stroke cycle. It has become an industry requirement to incorporate a pressure relief valve within the pump to protect the entire high pressure system from an unexpected excess pressure caused by a system malfunction. In order to protect the rail and injectors, the pressure relief valve must be in hydraulic communication with the rail, i.e., in parallel with the pump flow. In order to make the parallel hydraulic communication, typical executions have located the outlet check valve and pressure relief valve as separate devices within the pump housing. It is desirable to incorporate the outlet check valve and pressure relief valves into an outlet connector that can be assembled and tested before attachment to the high pressure pump, as disclosed in U.S. Pat. No. 8,132,558.

The maximum amount of fuel that can be transferred by a fuel pump is a function of the pressure at the end of the pumping cycle, the bulk modulus of the fuel (under that pressure and temperature), the trapped volume of the pump, and leakage losses in the pump. The trapped volume of a high pressure fuel pump is the volume fluidly connected with the pumping chamber, measured when the pumping plunger is at the end of a pumping stroke (TDC). The trapped volume of a high pressure pump commonly includes portions of the inlet check valve, the pump outlet check valve and pressure relief valve exposed to the pumping chamber. The trapped volume of a pump plays a significant role in the overall volumetric efficiency of the pump, especially when the volume displaced by the pumping plunger is small compared to the trapped volume. Keeping the trapped volume as small as possible improves the volumetric efficiency of the high pressure fuel pump. It is common for outlet check valves and pressure relief valves employed in high pressure fuel pumps to include coil springs to bias valve members (such as a valve ball) toward a closed position. It is also common that one or more coil springs employed for this purpose are in a volume exposed to the pumping chamber, which increase the trapped volume of the pump.

Because pressure relief valve flow returns to the pumping chamber, the springs associated with the pressure relief valve, and the chamber containing the springs are in direct communication with the pumping chamber. The volume of fluid in the spring chamber not occupied by the springs contributes to the trapped volume of the pump. The size of the springs necessary to hold the pressure relief valve closed increase along with the operating pressure of the direct injection system. Current and pending emissions regulations require direct injection operating pressures of 350 bar (35 MPa) or above, requiring increased spring dimensions to generate increased spring loads, and can result in increased trapped volume associated with the pressure relief valve.

SUMMARY

The disclosed inlet check valve is configured to control timing and quantity of fuel flow through a high pressure fuel pump. In the disclosed embodiment, the high pressure fuel pump includes a pumping chamber where a pumping plunger reciprocates between a pumping phase and a charging phase and an inlet feed passage for receiving fuel to be delivered to the pumping chamber. A benefit of the disclosed inlet check valve is the reduction of noise generated within the high pressure fuel pump.

The inlet control valve controls the flow of fuel through the inlet feed passage to the pumping chamber. The flow of fuel is controlled in a fluid flow passage which connects the inlet feed passage and the pumping chamber. The inlet control valve is comprised of a disc-shaped inlet valve member that is integrally connected to an inlet valve stem. The valve stem is coupled to an inlet valve armature. During operation, the valve member has a stroke along an axis between an open position and a closed position of the inlet control valve.

The valve member is biased toward the open position by an inlet valve bias member. In the closed position, an inlet valve seat having an annular surface is configured to mate with the valve member. The inlet valve seat defines a cylindrical bore for receiving the valve stem and guiding movement of the valve member between the open and closed positions. The valve member includes a first side in communication with the inlet feed passage and a second side in communication with the pumping chamber. In the closed position, the first side of the valve member mates with the valve seat within the pumping chamber and fluid flow is prevented through the fluid flow passage. In the open position, the second side of the valve member comes into contact with an inlet valve stop within the pumping chamber and fluid flow is permitted through the fluid flow passage. In the disclosed embodiment, the inlet valve stop is comprised of a pin supported by an inlet valve stop support which defines part of the pumping chamber. The inlet valve stop faces the inlet valve seat and is positioned within a portion of the pumping chamber on an opposite side of the valve member from the inlet valve seat.

An inlet valve solenoid including an electromagnetic coil generates a magnetic field in an inlet valve pole to attract the inlet valve armature. The inlet valve pole is positioned coaxial to the inlet valve armature. A gap is defined along the axis between the inlet valve armature and the inlet valve pole when the valve member is in the open position. In the disclosed embodiment, the gap is greater than the stroke of the valve member along the axis.

Energizing the inlet valve solenoid attracts the inlet valve armature, which compresses the bias member and moves the valve member from the open position to the closed position. In the closed position, an armature gap remains between the inlet valve armature and the inlet valve pole such that impact between the components is reduced.

In this manner, the inlet control valve reduces noise within the high pressure fuel pump.

BRIEF DESCRIPTION OF THE DRAWINGS

Aspects of a disclosed embodiment will be described in reference to the drawings, where like numerals reflect like elements.

DETAILED DESCRIPTION

Figure 1:
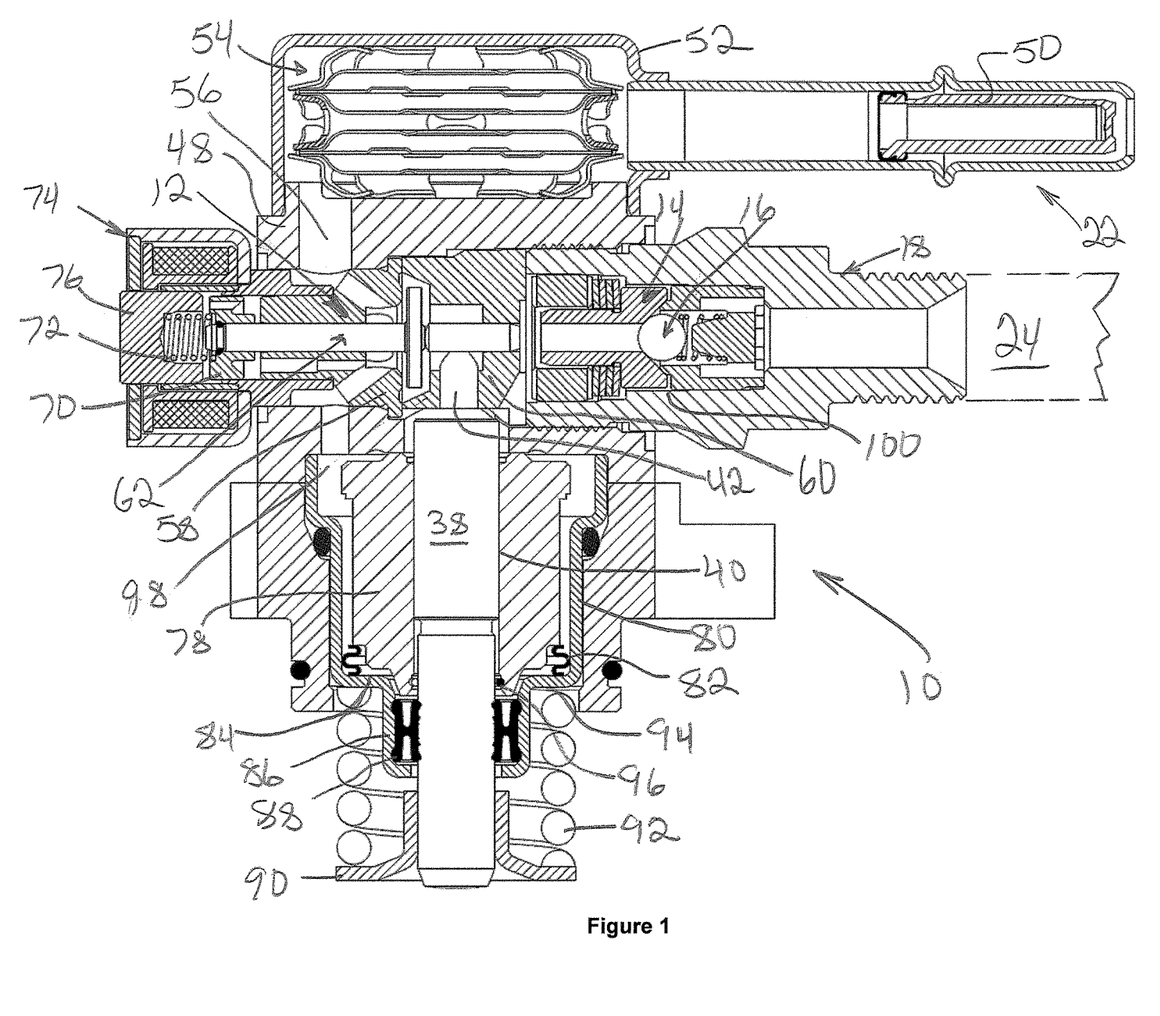
FIG. 1 is a sectional view of a high pressure fuel pump incorporating valves according to aspects of the disclosure.
Figure 2:
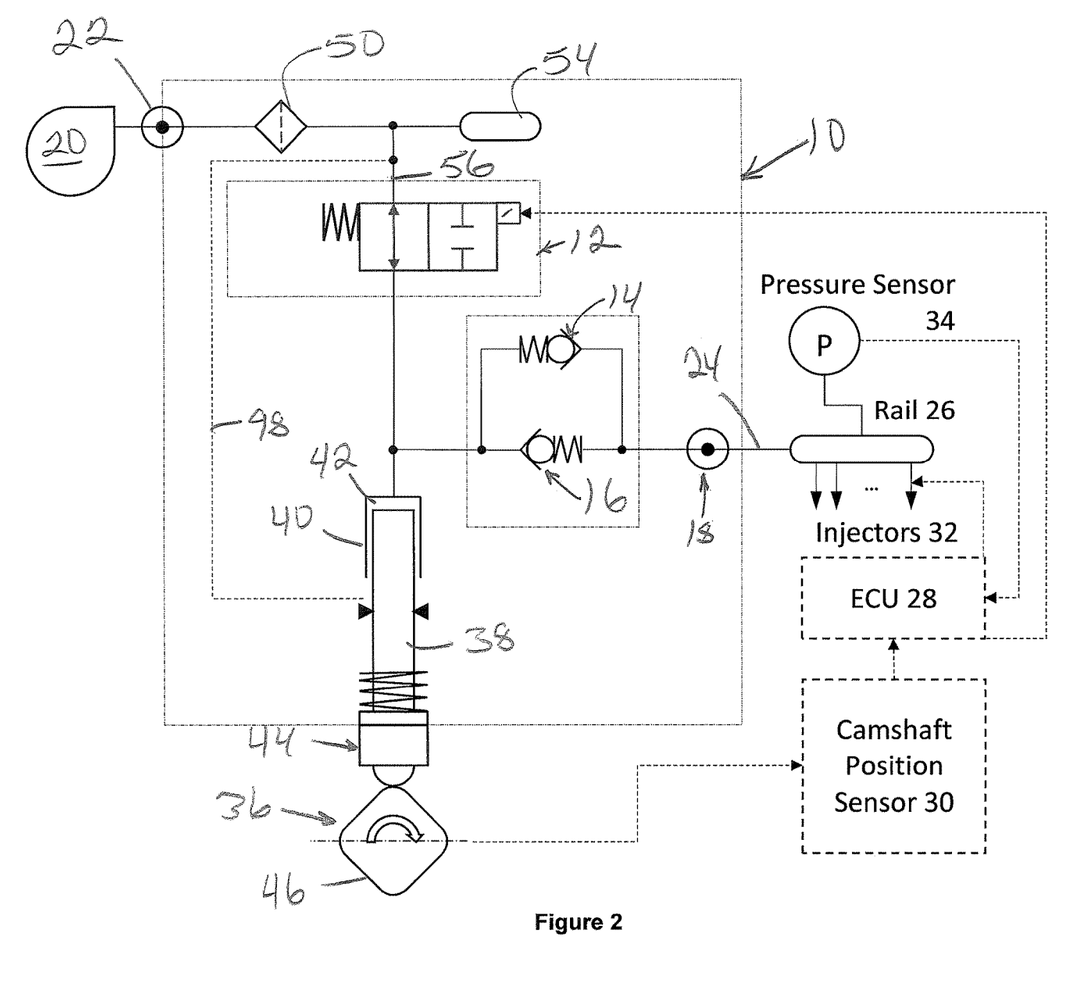
FIGS. 2-8 are schematic diagrams of a fuel injection system incorporating the disclosed high pressure fuel pump showing valve position and fuel flow in different operating states of the fuel injection system.

FIG. 1 is a sectional view of a high pressure fuel pump (HPP) 10 incorporating illustrative examples of an inlet control valve (ICV) 12, pressure relief valve (PRV) 14, and discharge check valve (DCV) 16 according to aspects of the disclosure. As will be discussed in greater detail below, the PRV 14 and DCV 16 are integrated with each other and situated in a pump outlet fitting 18 according to aspects of the disclosure. FIG. 2 is a schematic diagram showing the functional elements and relationships in a fuel injection system incorporating the disclosed HPP 10. With reference to FIG. 2, a low pressure pump (LPP) 20 supplies fuel to the HPP 10, via an inlet fitting 22. High pressure fuel leaves the HPP 10 through a discharge fitting 18 that communicates with a rail feed passage 24 and the common rail 26. In the fuel injection system of FIG. 2, engine control unit (ECU) 28 uses information from a crankshaft position sensor 30 and other inputs to operate fuel injectors 32 connected to the common rail 26. A pressure sensor 34 detects the pressure in the common rail 26 and provides this information to the ECU 28. The ECU 28 operates the fuel injectors 32 so that fuel is injected into each combustion chamber at the time and in the quantity demanded by the engine (not shown) according to the engine's operational condition, i.e., accelerating under load, idling, descending a long grade, etc. The ECU 28 and fuel injectors 32 are configured for substantially constant pressure in the common rail 26, which is maintained by the HPP 10 under control of the ECU 28.

The HPP 10 is illustrated in the form of a single plunger pump driven by a cam 36. A pumping plunger 38 reciprocates in a pump bore 40 to alternately expand the pumping chamber 42 to draw fuel into the pumping chamber and then pressurize the pumping chamber 42 to pump fuel to the common rail 26 via the outlet fitting 18 and rail feed passage 24. A cam follower 44 is biased toward the profile 46 of the cam 36 and is connected to the pumping plunger 38 to translate the shape of the cam profile 46 into reciprocal movement of the pumping plunger 38. The cam 36 has a four-sided profile 46 that will generate four charge/pump cycles of the pumping plunger 38 for each 360° rotation of the cam 36. The cam may have any number of lobes, with most having three or four lobes. The durations of the charging and pumping cycles are a function of the cam profile 46 and rotational speed of the cam 36. The cam 36 in FIG. 2 is shown at a "top dead center" (TDC) of the cam profile, which defines the end of a pumping cycle and the beginning of a charging cycle. In the symmetrical cam profile used to illustrate this application, the mid-point of each side of the cam profile 46 corresponds to the "lowest point" and is the "bottom dead center" (BDC) of the cam profile 46, which defines the end of a charging cycle and the beginning of a pumping cycle. In a cam profile having asymmetrical shape, the lowest point of the cam profile corresponding to BDC may not be at the mid-point between lobes. The total stroke of the pumping plunger is defined by the radial distance from the cam's TDC and BDC positions. Each lobe of the cam profile 46 may be asymmetric such that the angular displacement from BDC to TDC may be different from TDC to BDC. The shape of all lobes of the cam 36 is typically the same, but this is not required.

As shown in FIG. 1 a pump body 48 is the primary structural component of the disclosed HPP 10, and provides locations for receiving and mounting the components of the HPP 10. In addition to conventional fasteners, components of the HPP 10 may be secured to the pump body 48 by threaded, interference fit, or welded connections. Other methods of assembly and connection will occur to those skilled in the art, and the disclosed HPP 10 is not limited by exemplary methods discussed in this application. Stepped bores can be employed to trap internal components within the pump body 48. The inlet fitting 22 may include an inlet filter 50 and communicates with a volume defined by an accumulator cover 52 secured to the pump body 48. The accumulator cover 52 surrounds a volume containing an accumulator 54 configured to damp pressure fluctuations generated by the HPP 10 during operation. The accumulator 54 includes gas filled metal bellows supported within the accumulator cover 52 by an accumulator support and accumulator spacers, so that the accumulator 54 can change shape to absorb pressure pulses generated by the HPP 10. A control valve feed passage 56 defined by the pump body 48 leads from the accumulator 54 to the ICV 12.

An embodiment of an ICV 12 according to aspects of the disclosure is illustrated in FIG. 1 and FIGS. 9-16. As will be described in greater detail below, the disclosed ICV 12 functions as both a pump inlet check valve and an inlet metering valve to control both the timing and quantity of fuel flow through the ICV 12 to the pumping chamber 42. Elimination of a dedicated pump inlet check valve reduces the part count of the disclosed HPP 10, and also reduces the trapped volume of the pump by eliminating volume that would be associated with a dedicated pump inlet check valve. The illustrated ICV 12 is a two port, two position, normally open, directly solenoid actuated flow control valve. A control valve seat 58 is received in a stepped bore defined by the pump body 48 and defines a fluid flow passage connecting the control valve feed passage 56 with part of the pumping chamber 42 defined by a stop pin support 60. As best seen in FIGS. 9-16, the inlet valve 62 includes a disc shaped valve member 64 integrally connected to a valve stem 66 that passes through the inlet valve seat 58. The stop pin support 60 supports a stop pin 68 and defines part of the pumping chamber 42 in communication with the valve seat 58 and high pressure discharge from the pumping chamber 42 to the outlet fitting 18. The valve stem 66 is coupled to an inlet valve armature 70 by an armature retaining ring 71.

The inlet valve armature 70 and inlet valve 64 are biased toward an open position (shown in FIGS. 1 and 9) by an inlet valve spring 72.

A control valve solenoid 74 includes a coil that generates a magnetic field in a control valve pole 76 aligned with and adjacent to the inlet valve armature 70. When the control valve solenoid 74 is energized under control of the ECU 28, the magnetic field generated by the solenoid coil attracts the inlet valve armature 70 and the inlet valve 62 is moved to a closed position (shown in FIG. 10) against the bias of the inlet valve spring 72. In a closed position, the valve member 64 is in contact with the inlet valve seat 58, separating the control valve feed passage 56 from the pumping chamber 42. Closure of the inlet valve 62 during a pumping cycle allows fuel in the pumping chamber 42 to be pressurized and pumped through the DCV 16, outlet fitting 18 and high pressure passage 24 to the common rail 26. The timing of closure of the ICV 12 is set by the ECU 28 in response to inputs including the pressure of the common rail 26 detected by pressure sensor 34 and the camshaft position reported by the camshaft position sensor 30. Once the inlet valve 62 is closed, the inlet valve spring 72 cannot open the inlet valve 62 until the pressure of the pumping chamber falls to a minimum. This allows the control valve solenoid 74 to be de-energized before completion of a pumping cycle to reduce electrical power consumption and reduce heat added to the system.

The disclosed ICV configuration reduces the number of impacts between components to two impacts per actuation cycle, specifically impact of the inlet valve 62 and valve seat 58 and impact of the inlet valve 62 and stop pin 68. These impacts occur near the center of the HPP 10, and far from the extremities of the HPP 10 where noise is more easily radiated. Further noise reduction can be attained by selection of the material from which the stop pin 68 is constructed, such that the impact would generate less energetic vibrations. The surface of the valve member 64 that contacts the stop pin may include material such as engineered plastic, for example PEEK, to reduce noise generated by impact of the inlet valve 62 with the stop pin. The stop pin support 60 may be configured to reduce the transmission of impact vibrations from the stop pin to surrounding structures. In the disclosed HPP 10, the end of the stop pin 68 opposite the inlet valve 62 is exposed to a fluid volume leading to the DCV 16 and outlet fitting 18, which may reduce noise radiated from the stop pin 68.

The pumping plunger 38 reciprocates in the pumping bore 40 defined by a plunger sleeve 78. The plunger sleeve 78 is secured to the pump body 48 by a pilot tube 80 received in a shallow bore defined by the pump body 48. The plunger sleeve 78 is biased toward the pump body 48 by a load ring 82 compressed between an internal shoulder 84 of the pilot ring 80 and the lower end of the plunger sleeve 78. A neck portion 86 of the pilot tube 80 supports a plunger seal 88 that seals against a lower portion of the pumping plunger 38. A plunger return spring seat 90 is secured to the lower end of the pumping plunger 38 and a plunger return spring 92 is biased between the plunger return spring seat 90 and an external shoulder 94 of the pilot tube 80. A plunger retaining ring 96 is received in a groove defined at the lower end of the pumping bore 40 to prevent the pumping plunger 38 from being pulled out of the pumping bore 40 by the plunger return spring 92. As shown in FIG. 2, a cam follower 44 is situated between the pumping plunger 38 and the cam 36 and is arranged to follow the cam profile 46, exerting reciprocal motion on the pumping plunger 38.

Some leakage will occur between the pumping plunger 38 and pumping bore 40 during pump operation. The disclosed HPP 10 defines a pump drain 98 from the pilot tube 80 to the control valve feed 56 via passages in the control valve seat 58, allowing leakage flow back to the low pressure inlet of the HPP 10. A pumping plunger 38 having a pumping end with a greater diameter than the driven end as shown in FIG. 1, will tend to "pump" leakage flow during the charging cycle, and this "pumped" leakage flow is also directed to the pump drain 98.

Figure 9:
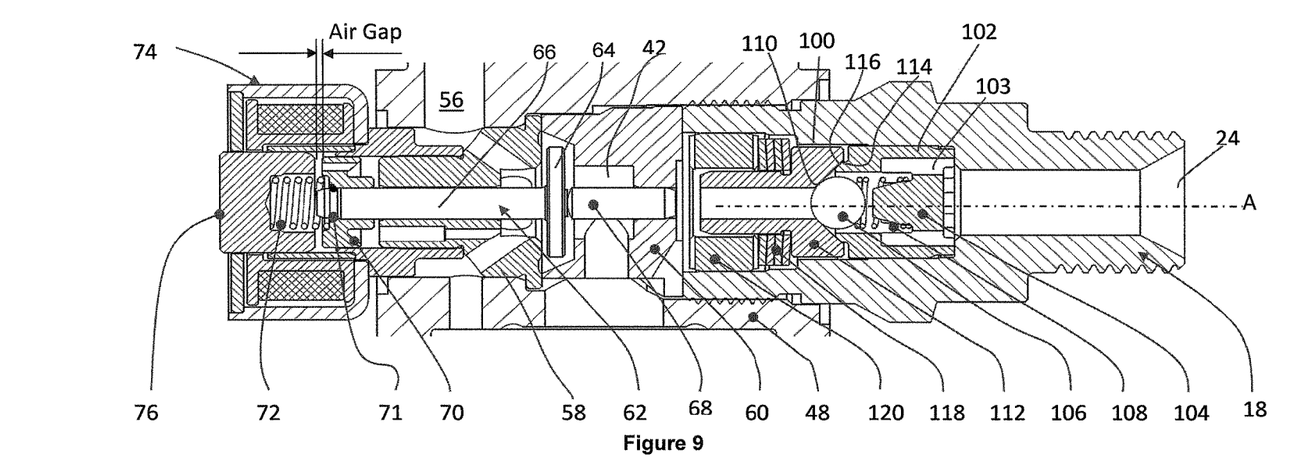
FIGS. 9-16 are enlarged sectional views of a portion of the high pressure fuel pump of FIG. 1, showing the structure and operation of valves in different operating states of the high pressure fuel pump.
Figure 10:
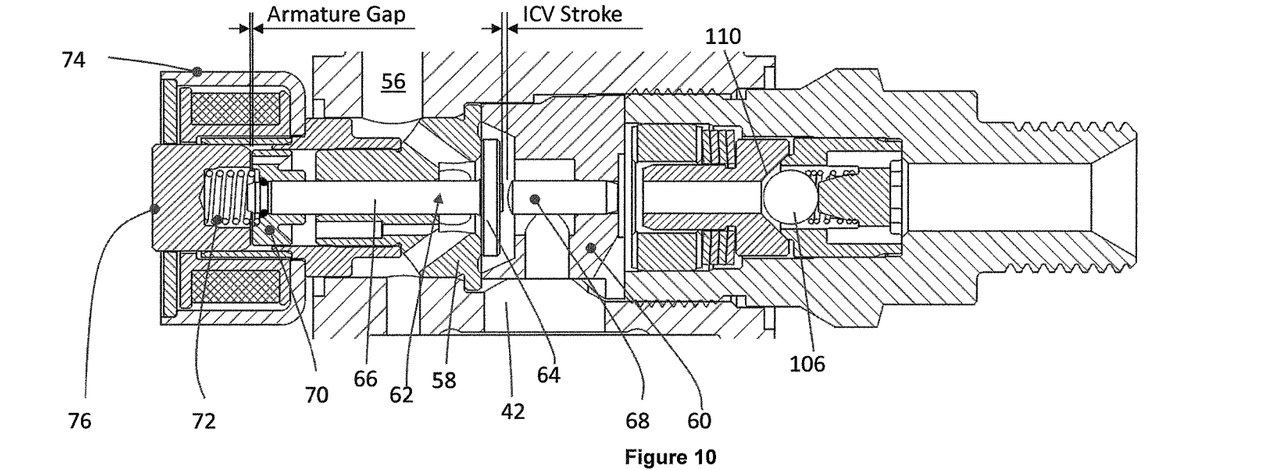

With reference to FIGS. 1, 9 and 10, the ICV 12 includes the control valve solenoid 74 with control valve pole 76, inlet valve 62, control valve seat 58, inlet valve armature 70 and inlet valve spring 72. The inlet valve 62 includes a valve stem 66 integrally connected to a valve member 64 configured to mate with an annular surface on the valve seat 58 when moved to the closed position. The valve stem 66 reciprocates in a bore defined by the valve seat 58, guiding movement of the inlet valve 62 between the open position (FIG. 9) and the closed position (FIG. 10). The inlet valve 62 is biased toward an open position by the inlet valve spring 72, which acts on the inlet valve armature 70 and inlet valve 62. The open position of the inlet valve 62 is determined by contact between the valve member 64 and the stop pin 68 as shown in FIG. 9. When the inlet valve 62 is in the open position, there is an air gap between the inlet valve armature 70 and the control valve pole 76. As shown in FIG. 10, when the solenoid 74 is energized, the inlet valve armature 70 and inlet valve are attracted to the control valve pole 76, compressing the inlet valve spring 72 and closing the valve member 64 against the valve seat 58.

Movement of the inlet valve 62 between contact with the stop pin 68 and contact with the valve seat 58 defines the ICV stroke as shown in FIG. 10. According to aspects of the disclosure, the ICV stroke is less than the air gap between the control valve pole 76 and the inlet valve armature 70 when the inlet valve 62 is in the open position, leaving an armature gap between the control valve pole 76 and the inlet valve armature 70 when the inlet valve is in the closed position. The length of the valve stem 66 and the shape of the inlet valve armature 70 are selected to ensure the inlet valve armature 70 does not contact the control valve pole 76 when the inlet valve 62 is in the closed position. As shown in FIG. 10, an armature gap remains between the inlet valve armature 70 and the control valve pole 76 when the inlet valve 62 is in the closed position. The armature gap eliminates one point of contact between moving components in the disclosed ICV 12.

FIGS. 1 and 9-16 illustrate a discharge check valve (DCV) 16 and pressure relief valve (PRV) 14 integrated into a pump outlet fitting 18 according to aspects of the disclosure. With specific reference to FIGS. 1 and 9, the pump outlet fitting 18 defines a stepped bore 100 communicating at one end with the pumping chamber 42 (or a passage fluidly connected to the pumping chamber) and at the other end with the high pressure passage 24 to the common rail 26. A PRV seat 102 defines an outlet flow path 103 through bores disposed around a discharge check valve spring seat (DCV spring seat) 104 arranged on an axis A of the outlet fitting 18. The discharge check valve ball (DCV ball) 106 is biased by the DCV spring 108 toward a discharge check valve seat (DCV seat) 110 on a pressure relief valve shuttle (PRV shuttle) 112. The PRV seat 102 includes an annular, conical surface 114 that mates with a complementary surface 116 (surrounding the DCV seat 110) on the PRV shuttle 112. The PRV seat 102 is in a fixed position defined by the stepped bore 100, and the PRV shuttle 112 is biased against the PRV seat 102 by a PRV spring 118.

According to aspects of the disclosure, the PRV spring 118 is a stack of conical disc springs compressed between a pressure relief valve cup (PRV cup) 120 and the PRV shuttle 112 to bias the PRV shuttle 112 toward a closed position illustrated in FIGS. 1 and 9. The stacked conical disc springs generate the high force necessary to maintain the PRV 14 in the closed position against operating pressures in the common rail 26 of 350 bar (35 MPa) or more, in a very compact configuration. Little or no space is left between the stacked conical disc springs, and the stroke of the PRV shuttle 112 is very short, meaning very little trapped volume is associated with the disclosed PRV 14. The PRV cup 120 has an interference fit within the stepped bore 100 of the pump outlet fitting 18, and traps the PRV shuttle 112, PRV spring 118, DCV ball 106, DCV spring 108, and PRV seat 102 within the pump outlet fitting 18. The position of the PRV cup 120 in the stepped bore 100 is set during assembly to calibrate the opening pressure of the PRV 14. The opening pressure of the PRV 14 can be calibrated before assembly of the outlet fitting 18 to the pump body 48. The PRV cup 120 and PRV shuttle 112 are configured to occupy most of the space within the stepped bore 100 between the DCV ball 106 and the pumping chamber 42, further reducing the trapped volume of the HPP 10 attributable to the PRV 14.

Figure 13:
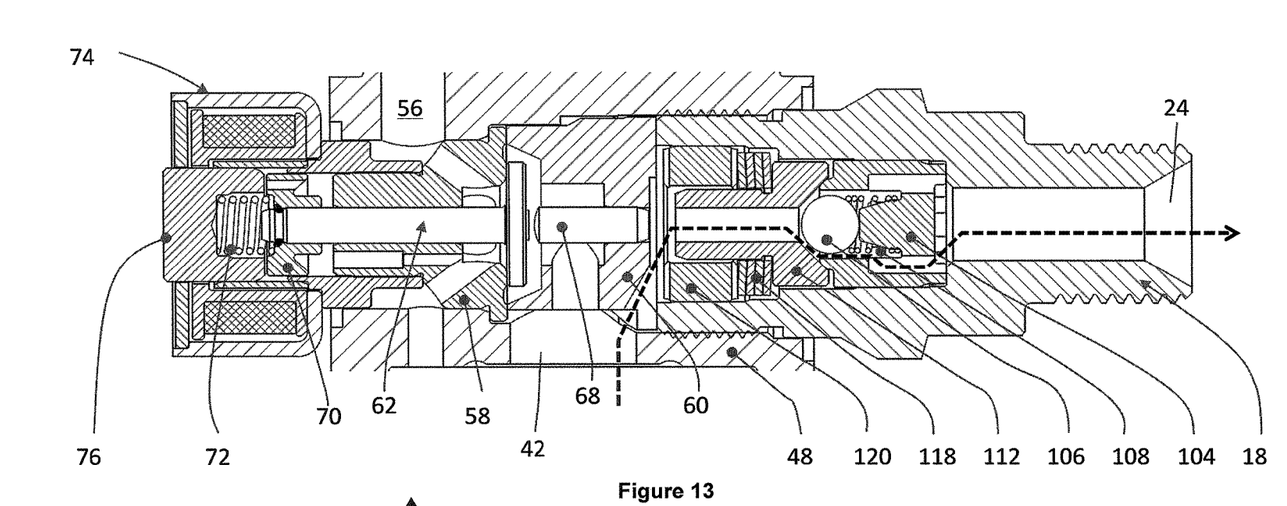
Figure 16:
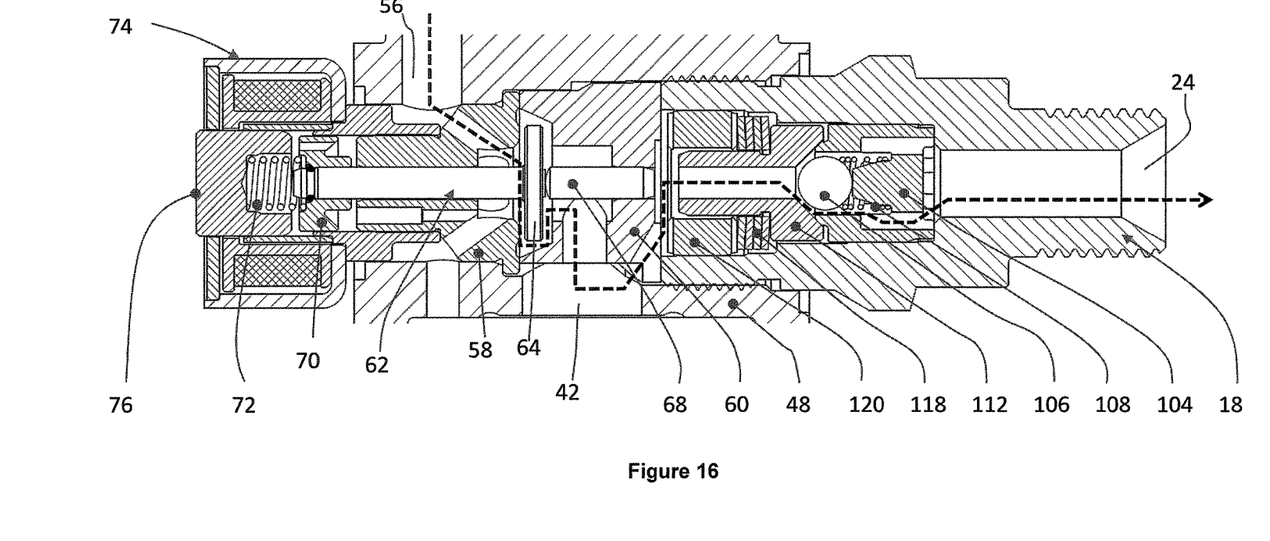

The outlet fitting 18 including an integrated PRV 14 and DCV 16 minimize the trapped volume of the HPP 10 to which the outlet fitting 18 is attached, provide high flow capacity through the PRV 14, and the short stroke of the PRV shuttle 112 results in fast actuation and closure of the PRV 14 while the HPP 10 is operating. The DCV ball 106 opens only when the pressure in the high pressure passage 24 leading to the common rail 26 is less than the pressure in the pumping chamber 42 or passage leading from the pumping chamber to the pump outlet fitting 18 as shown in FIGS. 10, 13, and 16. This condition occurs during a pumping cycle when the pressure of the pump outlet passage 24 and common rail 26 are below maximum pressure.

Figure 3:
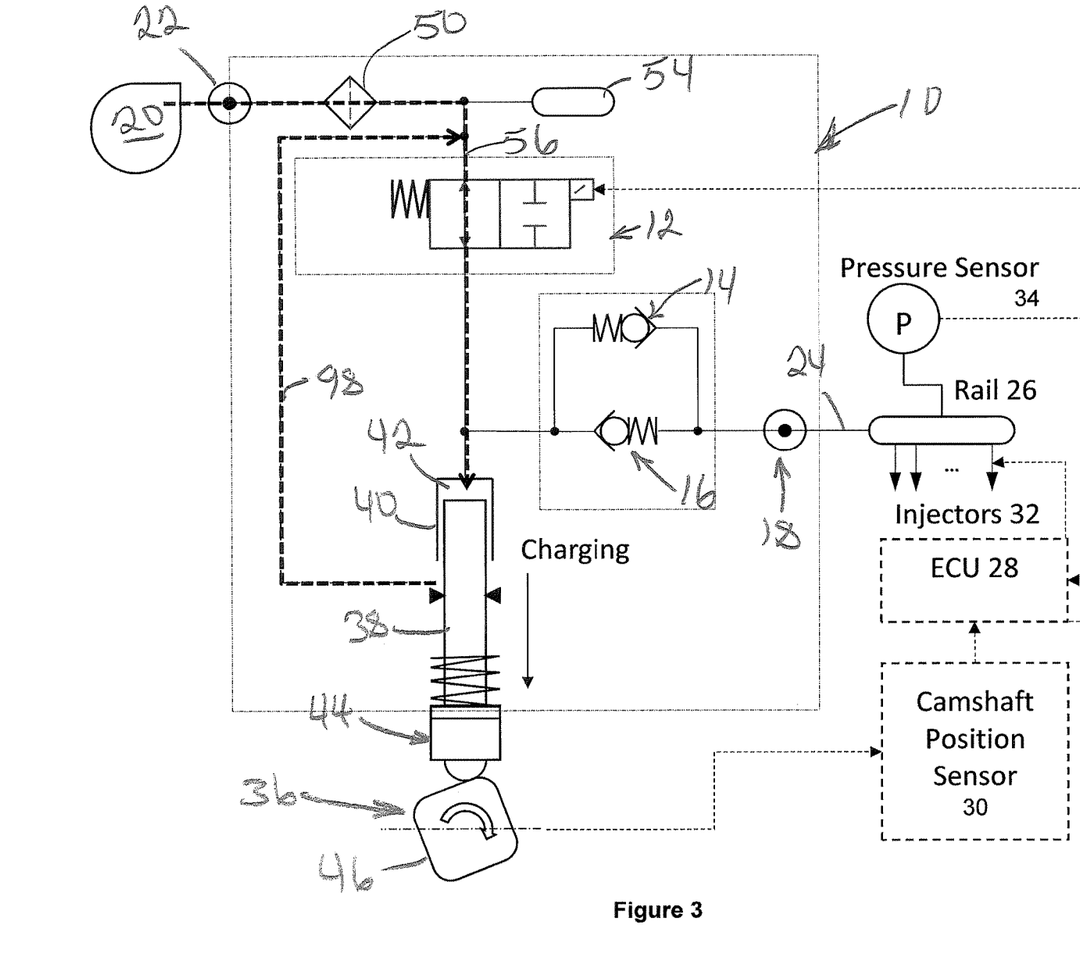
Figure 11:
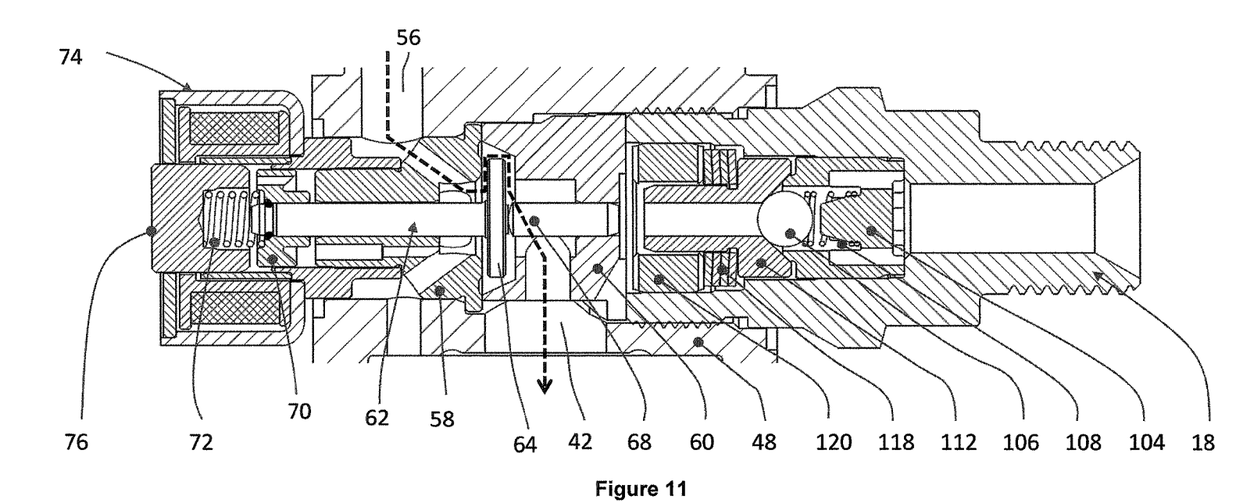

FIGS. 3 and 11 illustrate fuel flow in the disclosed HPP 10 during a charging cycle of the pump, i.e., during retraction of the pumping plunger 38. Fuel pumped by the LPP 20 enters the inlet fitting 22 and passes through the inlet filter 50 (if present). The inlet fitting 22 is in fluid communication with the accumulator 54, and fuel may be routed through the accumulator 54 as shown in FIG. 1. The ICV 12 is in its normally open state, and allows fuel to flow into the pumping chamber 42 as the pumping plunger 38 is retracted. The DCV 16 is held closed by pressure behind the DCV ball 106, which is exposed to the pressure of the common rail 26. In the disclosed HPP 10, the pumping chamber 42 is completely filled with fuel by the end of the charging cycle. When the cam follower 44 reaches the center of a side of the cam profile 46 the plunger stops retracting, ending the charging cycle. As the cam 36 rotates further, the cam follower 44 begins pushing the pumping plunger 38 into the pumping bore, beginning a pumping cycle.

Figure 4:
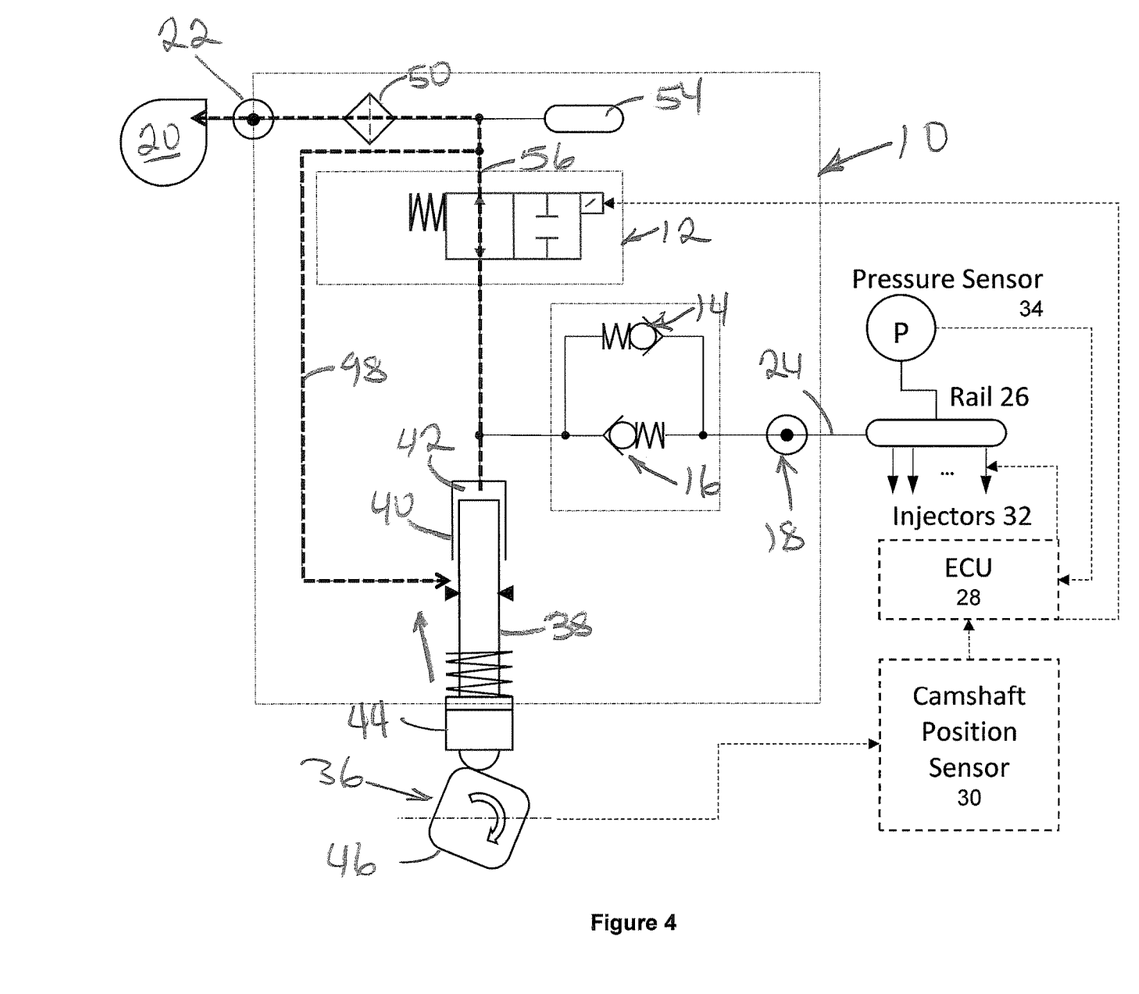
Figure 12:
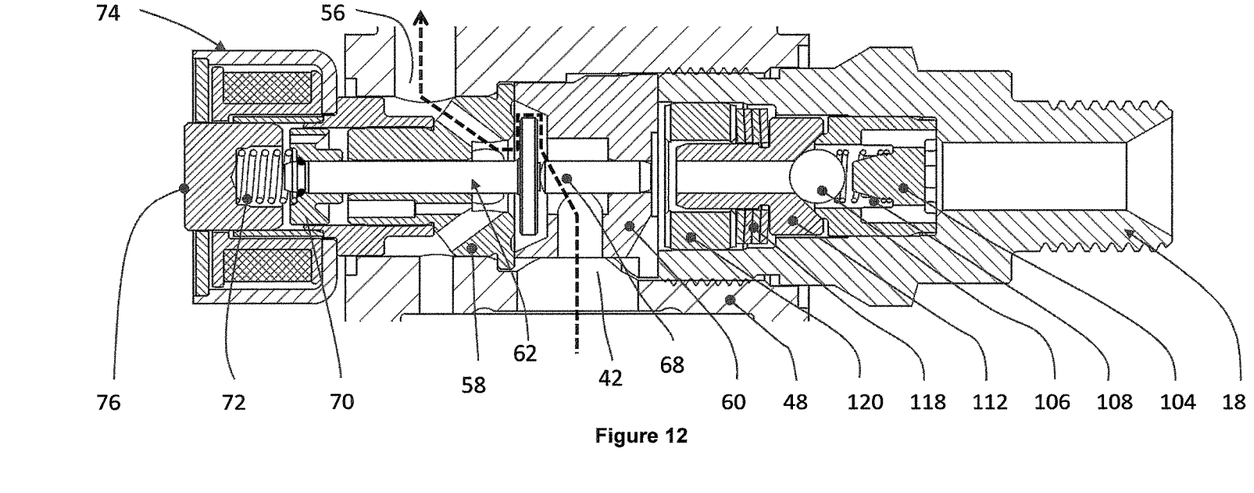

FIGS. 4 and 12 illustrate an initial portion of a pumping cycle, during which the ICV 12 remains open. When the pumping plunger 38 is being driven into the pumping bore 40, the volume of the pumping chamber 42 is reduced, pushing fuel out of the pumping chamber 42. With the ICV 12 open, fuel is "spilled" from the pumping chamber back toward the low pressure inlet. When the ICV 12 is closed by the ECU 28 energizing the control valve solenoid 74, fuel in the pumping chamber 42 begins to be pressurized by the pumping plunger 38. When the pressure in the pumping chamber 42 exceeds the pressure of the common rail 26, the DCV 16 opens and fuel is pumped to the common rail 26. The timing of ICV 12 closure determines the quantity of fuel pumped to the common rail 26, because fuel pressurization cannot begin until the ICV 21 is closed. In this manner, the ICV 12 meters the quantity of fuel pumped to the common rail 26 under control of the ECU 28.

Figure 5:
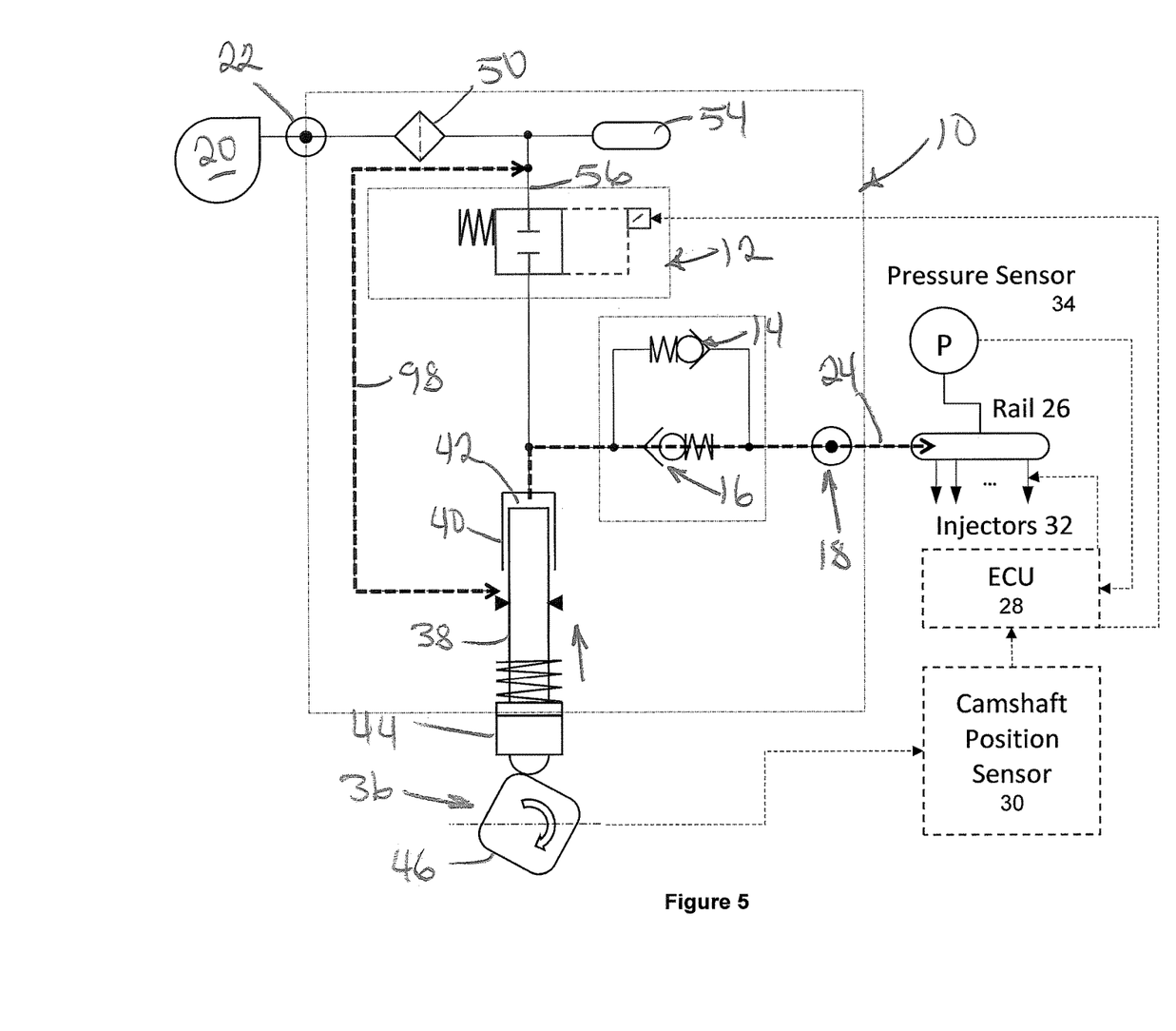

FIGS. 5 and 13 illustrate the position of the ICV 12 and DCV 16 during fuel delivery to the common rail 26. The control valve solenoid 74 is energized, the ICV 12 is closed, and fuel in the pumping chamber 42 has reached a pressure greater than the pressure of the common rail 26, opening the DCV 16. Any fuel that leaks between the pumping plunger 38 and the pumping bore 40 is directed by the pump drain 98 back to the low pressure inlet of the HPP 10. Pressure in the pumping chamber 42 acts on the valve member 64 to hold the inlet valve 62 in the closed position. The inlet valve spring 72 cannot open the inlet valve 62 until the pressure of the pumping chamber 42 drops to a minimum. This permits intentionally de-energizing the control valve solenoid 74 before the completion of a pumping cycle to reduce electrical power consumption and reduce heat added to the system.

Figure 6:
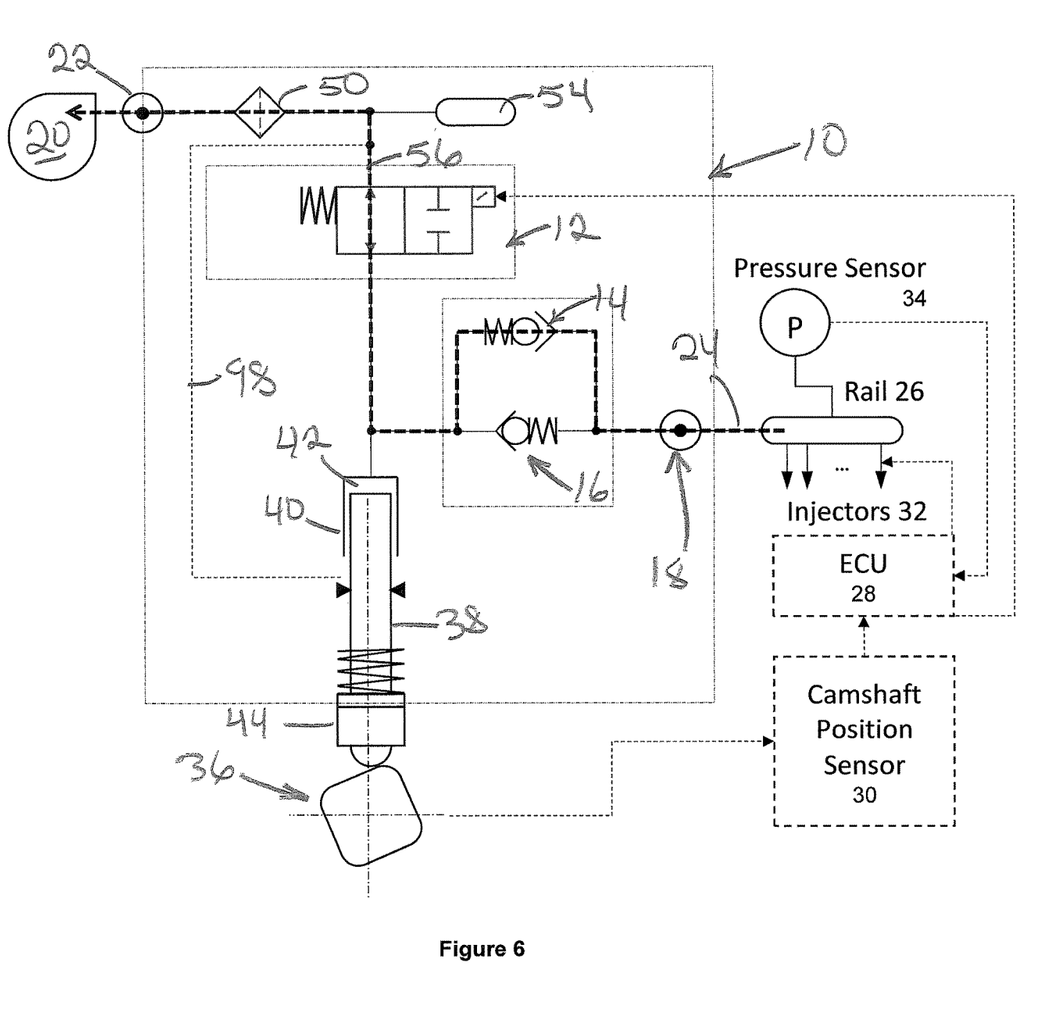
Figure 14:
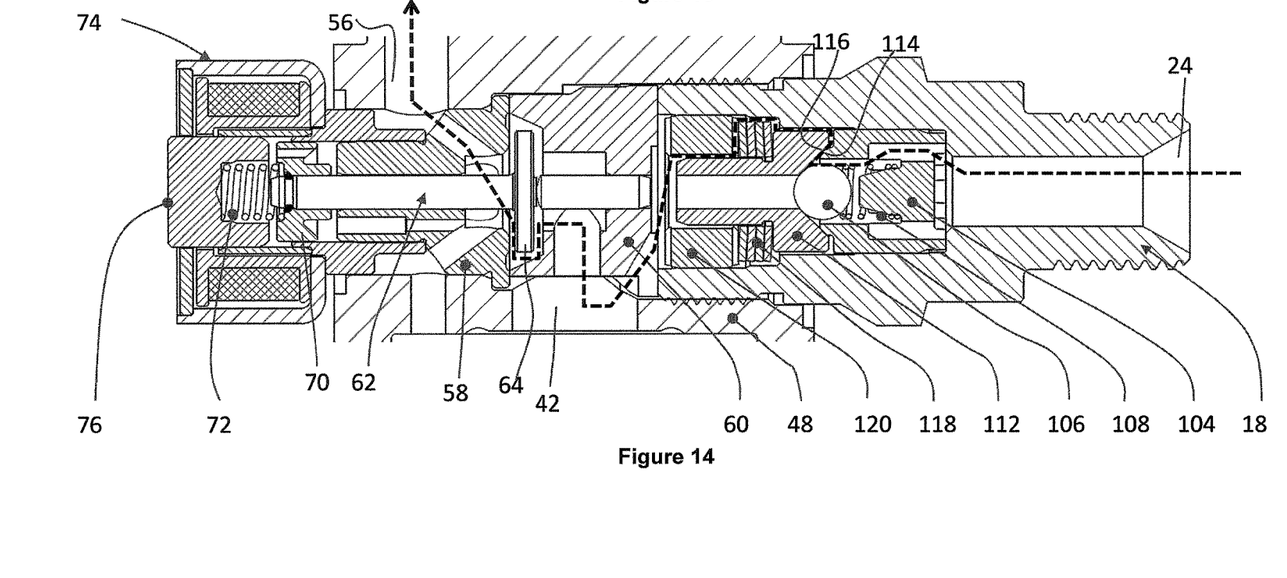

FIGS. 6 and 14 illustrate actuation of the PRV 14 in response to a heat soak condition where the pressure of the common rail 26 is greater than maximum pressure. The PRV shuttle 112 and closed DCV ball 106 are exposed to the pressure of the common rail 26 through the high pressure passage 24 connected to the pump outlet fitting 18. The PRV shuttle 112 is moved away from the PRV seat 102 against the bias of the PRV spring 118 and allows excess pressure to pass between valve surfaces 114, 116, through the pumping chamber 42, the open ICV 12, and control valve feed passage 56 to the low pressure inlet. In a heat soak condition, the PRV shuttle 112 will move (open) a small amount because the volume of fluid being relieved is small and the rate of fluid flow is low.

Figure 7:
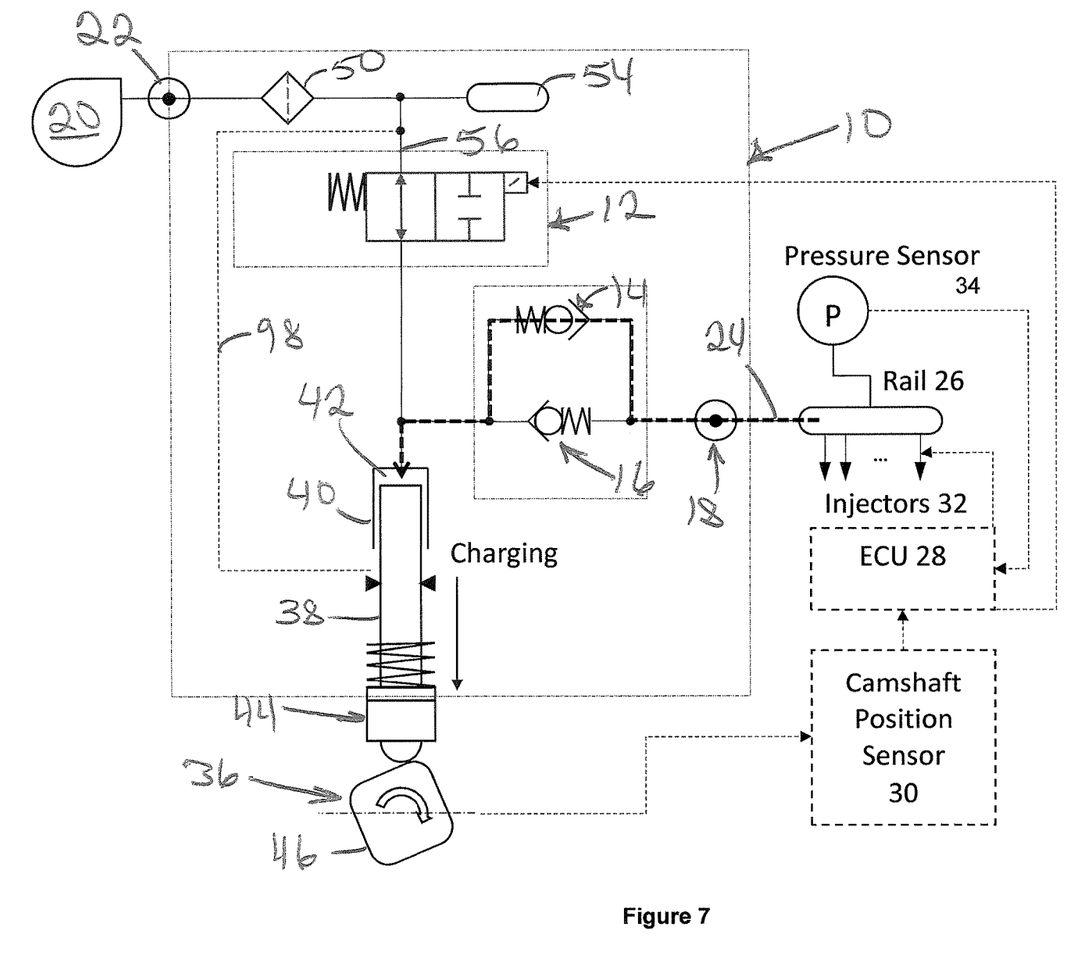
Figure 15:
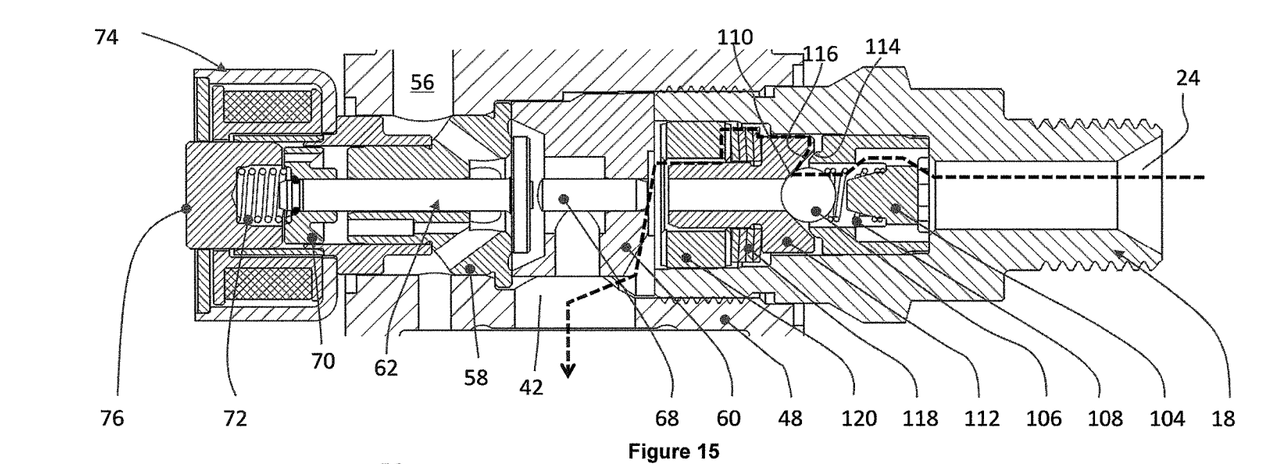

FIGS. 7 and 15 illustrate actuation of the PRV 14 during pump operation, which is exactly the same as PRV 14 actuation in response to a heat soak, except the PRV shuttle 112 will open further due to the larger volume of fluid to be relieved and the high rate of fluid flow required to relieve pressure during a charging cycle of the pump. As shown in FIG. 15, the inlet valve 62 is held closed by high pressure fuel being relieved from the common rail through the PRV 14. Fuel being relieved from the common rail 26 fills the pumping chamber 42 as the pumping plunger 38 is retracted during a charging cycle of the pump.

Figure 8:
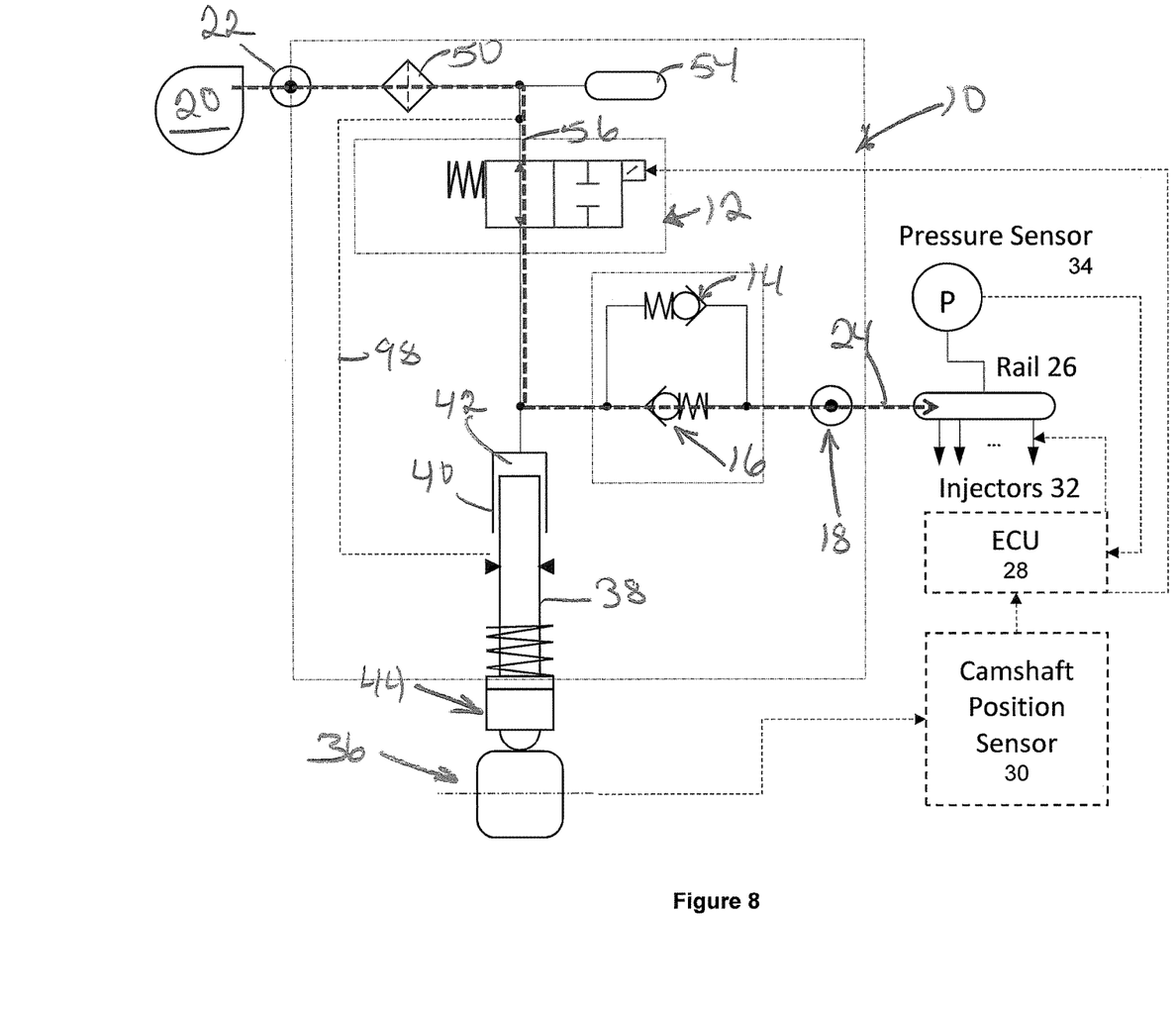

FIGS. 8 and 16 illustrate fuel flow through the ICV 12, pumping chamber 42 and DCV 16 during a "limp home" scenario where the HPP 10 is not operational. In this scenario, the high pressure passage 24 and common rail 26 are no longer being supplied with high pressure fuel. The DCV valve spring 108 is selected with a light bias that will open when exposed to feed pressure generated by the LPP 20 that has passed through the open ICV 12 and the pumping chamber 42. With no pressure behind it, the DCV ball 106 opens when exposed to feed pressure and allows low pressure fuel to fill the common rail 26. Common rail pressure corresponding to feed pressure from the LPP 20 is sufficient to allow the fuel injectors 32 and engine to operate at reduced power. Engine operation will be sub-optimal, but sufficient to provide minimum driving capabilities towards a safe environment or maintenance facility.

While the embodiment of the disclosed inlet control valve 12 has been set forth for purposes of illustration, the foregoing description should not be deemed a limitation of the invention. Accordingly, various modifications, adaptations and alternatives may occur to one skilled in the art without departing from the spirit of the disclosure and the scope of the claimed coverage.

What is claimed:

1. A control valve for a high pressure fuel pump, said high pressure fuel pump having an inlet valve feed passage and a pumping chamber where a pumping plunger reciprocates between a pumping phase and a charging phase, said control valve comprising:
   an inlet valve arranged to control fluid flow from said inlet valve feed passage to said pumping chamber, said inlet valve including a disc-shaped valve member integrally connected to an inlet valve stem, said valve member having a stroke along an axis between an open position to a closed position, said valve stem coupled to an inlet valve armature such that the inlet valve armature and the valve member are coupled to move together;
   an inlet valve bias member biasing said valve member toward said open position;
   an inlet valve seat having an annular surface configured to mate with said valve member and defining a cylindrical bore, said cylindrical bore receiving said valve stem and guiding movement of the valve member between said open and closed positions, a first side of said valve member in communication with said inlet valve feed passage and a second side of said valve member in communication with said pumping chamber;
   an inlet valve stop facing said inlet valve seat and positioned on an opposite side of said valve member from said inlet valve seat;
   an inlet valve solenoid including an electromagnetic coil generating a magnetic field in an inlet valve pole to attract said inlet valve armature, said inlet valve pole positioned coaxial to said inlet valve armature;
   an air gap defined along said axis between said inlet valve armature and said inlet valve pole when said valve member is in said open position, said air gap being greater than said stroke;
   a fluid flow passage connecting said inlet valve feed passage and said pumping chamber; and
   wherein said valve member is in contact with said inlet valve stop permitting fluid flow through said fluid flow passage when said valve member is in said open position, energizing said solenoid moves said valve member from said open position to said closed position compressing said bias member, and said valve member is mated with said inlet valve seat preventing fluid flow through said fluid flow passage and leaving an armature gap between said inlet valve armature and said inlet valve pole when said valve member is in said closed position.

2. The control valve of claim 1, wherein the inlet valve stop is positioned within a portion of the pumping chamber.

3. The control valve of claim 1, wherein the valve stem is coupled to the inlet valve armature by an armature retaining ring.

4. The control valve of claim 1, wherein said inlet valve stop is comprised of a pin facing said valve member.

5. The control valve of claim 1, wherein the inlet valve stop is supported by an inlet valve stop support which defines part of the pumping chamber.

6. The control valve of claim 1, wherein contact between the valve member and the inlet valve stop and contact between the valve member and the inlet valve seat occurs in the pumping chamber.

7. The control valve of claim 1, wherein said armature gap is greater than said stroke.

8. A method of controlling timing and quantity of fuel flow through an inlet feed passage of a high pressure fuel pump, said high pressure fuel pump having a pumping chamber where a pumping plunger reciprocates between a pumping phase and a charging phase, said method comprising:
   defining a fluid flow passage connecting said inlet valve feed passage and said pumping chamber;
   providing an inlet control valve arranged to control fluid flow from said inlet valve feed passage to said pumping chamber, said inlet valve including a disc-shaped valve member integrally connected to an inlet valve stem, said valve member having a stroke along an axis between an open position permitting fluid flow through said fluid flow passage to a closed position preventing fluid flow through said fluid flow passage, said valve stem coupled to an inlet valve armature such that the inlet valve armature and the valve member are coupled to move together;
   biasing said valve member toward said open position;
   providing an inlet valve seat having an annular surface and defining a cylindrical bore, said inlet valve seat configured to mate with said valve member in said closed position, said cylindrical bore receiving said valve stem and guiding movement of the valve member between said open and closed positions, a first side of said valve member in communication with said inlet valve feed passage and a second side of said valve member in communication with said pumping chamber;
   arranging an inlet valve stop on an opposite side of said valve member from said inlet valve seat;
   defining a gap along said axis between said inlet valve armature and an inlet valve pole when said valve member is in said open position, said gap being greater than said stroke; and
   generating a magnetic field in said inlet valve pole with an inlet valve solenoid including an electromagnetic coil to attract said inlet valve armature and move said valve member from said open position to said closed position compressing said bias member and leaving an armature gap between said inlet valve armature and said inlet valve pole.

9. The method of claim 8, wherein said arranging said inlet valve stop includes positioning said inlet valve stop within a portion of the pumping chamber.

10. The method of claim 8, wherein said generating said magnetic field includes the valve member and the inlet valve seat coming into contact with each other in the pumping chamber.

11. The method of claim 8, wherein said arranging said inlet valve stop includes said valve member and said inlet valve stop coming into contact with each other in said pumping chamber.

12. The method of claim 8, wherein said arranging said inlet valve stop includes said inlet valve stop comprising a stop pin supported by a stop pin support.

13. The method of claim 8, wherein said providing said inlet control valve includes coupling said inlet valve stem to said inlet valve armature with an armature retaining ring.

* * * * *